United States Patent

[11] 3,586,163

| [72] | Inventors | Karl K. Loehrer<br>Cedarburg;<br>Daniel J. Foote, Wauwatosa, both of, Wis. |
|---|---|---|
| [21] | Appl. No. | 830,025 |
| [22] | Filed | June 3, 1969 |
| [45] | Patented | June 22, 1971 |
| [73] | Assignee | Master Lock Company<br>Milwaukee, Wis. |

[54] BICYCLE LOCK AND KEY PACKAGE
6 Claims, 9 Drawing Figs.

[52] U.S. Cl. ................................................ 206/80R
[51] Int. Cl. .............................................. B65d 81/00,
B65d 85/00
[50] Field of Search .......................................... 206/78, 78
B, 80, 45.31, 45.34

[56] References Cited
UNITED STATES PATENTS
2,858,938 11/1958 Seyforth ...................... 206/80
3,233,726 2/1966 Gero ............................. 206/45.31
3,236,372 2/1966 Foote ........................... 206/78
3,497,059 2/1970 Watts, Jr. ..................... 206/45.31

*Primary Examiner*—William T. Dixson, Jr
*Attorney*—Curtis B. Morsell, Sr.

ABSTRACT: A display type of sleeve envelopes the major portion of the elongated shackle of a bicycle padlock or the like and retains in the sleeve against removal by a tamperer a "bubble" like key enclosure. The padlock body applied externally to the protruding inner ends of the shackle legs closes the bottom of the sleeve and prevents movement of the padlock assemblage in one direction, while the closed end of the shackle bridges walls or shoulders at the top of the sleeve to prevent withdrawal movement of the shackle from the sleeve in another direction. The sleeve containing the padlock assemblage for shipping and customer inspection at a dealer's, renders the product visible.

PATENTED JUN 22 1971 3,586,163
SHEET 1 OF 2
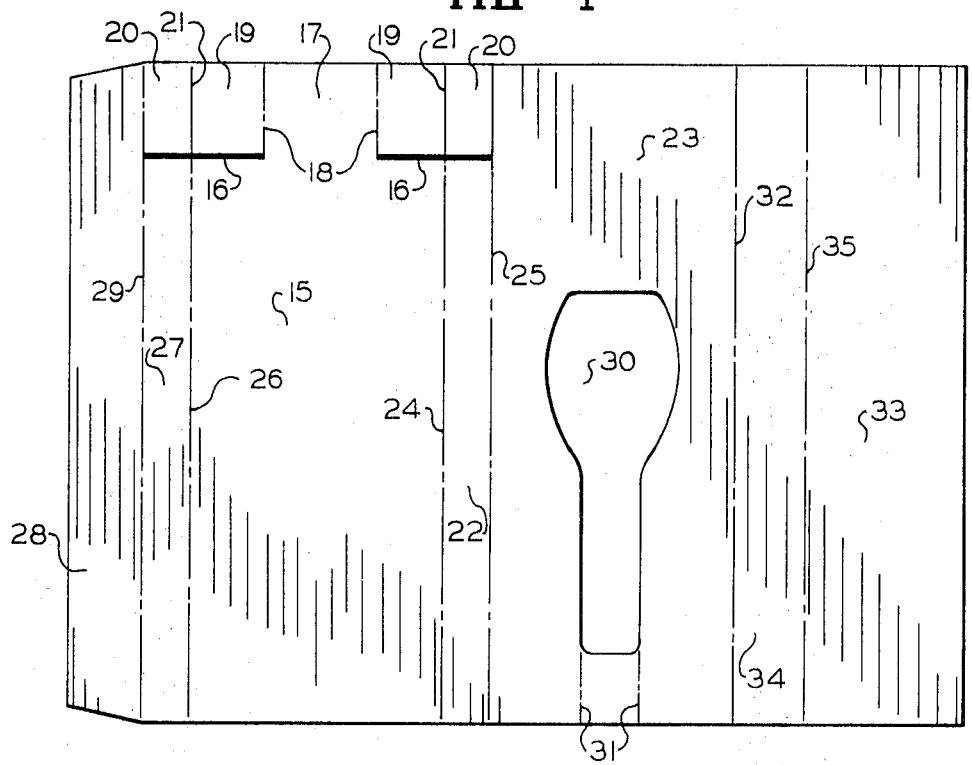
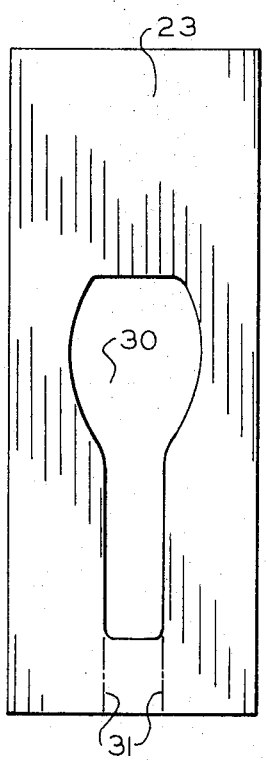
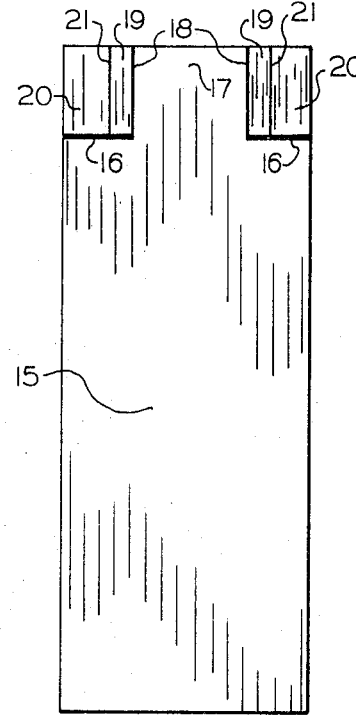
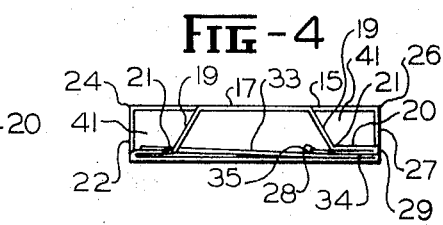
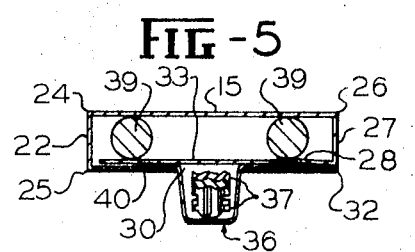
INVENTORS
KARL K. LOEHRER
DANIEL J. FOOTE
BY
Curtis B. Morsell, Sr.
ATTORNEY

PATENTED JUN 22 1971

INVENTORS
KARL K. LOEHRER
DANIEL J. FOOTE

BY

*Curtis B. Morsell, Sr.*
ATTORNEY

BICYCLE LOCK AND KEY PACKAGE

BACKGROUND OF THE INVENTION

Padlocks with elongated shackles are customarily used for locking bicycles, freezers, duffel bags and various other like apparatuses and devices. For many years it was the practice for the manufacturer to pack a bicycle padlock and its keys within a box or carton in which condition the padlocks are shipped and are ultimately thus disposed on the dealers's shelves and counters for sale to customers. A bicycle padlock as thus disposed is not readily visible to a prospective purchaser, and, with the keys being in the box or carton, there is also the possibility of the keys becoming lost or mixed up.

To remedy this undesirable result the Foote U.S. Pat. No. 3,236,372 of Feb. 22, 1966 provided a sleeve adapted to be slipped onto the major portion of the elongated shackle of a bicycle padlock in encasing relation thereto, with the sleeve containing advertising indicia and display matter, the sleeve being such that the characteristics of the padlock assemblage were readily visible to a prospective purchaser. Also, the sleeve was formed so as to disengageably carry on its face the keys for the particular encased padlock. However, experience developed the fact that children or tamperers in a store would frequently remove the keys from the sleeve and keep or misplace the same, with the undesirable result that the dealer might find that one or more displayed padlocks had its keys missing.

SUMMARY OF THE INVENTION

With the last-mentioned objection in mind it is, therefore, a primary object of the present invention to provide a bicycle lock and key package wherein a sleevelike member may bear advertising and display indicia and advantageously display the padlock assemblage while also having secured therein a key-enclosing "bubble" which keeps the proper keys with the sleeve-encased padlock in a manner so that the keys cannot be removed and separated from the sleeve and padlock assemblage, nor the padlock be removed, without materially tearing and mutilating the sleeve.

A further object of the invention is to provide a bicycle lock and key package in which the lock body applied to the extended lower ends of the sleeve-encased padlock shackle abuts and closes the lower end of the sleeve and this abutment, together with internal shoulder forming partitions within the other end of the sleeve which are bridged by the external closed, curved end of the shackle, prevents the shackle from being pulled free of the sleeve in either direction.

Still another object of the present invention is to provide a bicycle lock and key sleeve which can be folded and assembled from a one-piece paperboard blank and which, in its "setup" condition, may have the key-loaded "bubble" securely set into a pocket therefor, and the major portion of the padlock shackle may be slipped into the sleeve and secured therein by the lock body when the latter is fastened onto the protruding legs of the shackle. Thus, a neat advertising display and a sleeve-encased assemblage results which maintains the keys against unauthorized displacement and loss.

A further more specific object of the invention is to provide a bicycle padlock and key package which, because it leaves the outer closed end of the shackle exposed, permits the display assemblage to be hung from a peg on a display board or the like, by engaging the closed end of the shackle with a mounted peg or hook.

Further objects of the invention are to provide a bicycle padlock and key package of simple and inexpensive construction; which is strong and durable and secure in its shackle-encasing relationship; which is easy to apply to a padlock for shipment and display; which is unique and attractive in appearance; and which is otherwise well suited for the intended purposes.

BRIEF DESCRIPTION OF THE DRAWINGS

In the accompanying drawings wherein the same reference characters designate the same or similar parts in all of the views:

FIG. 1 is a plan view of the outstretched flat one-piece blank from which the improved bicycle lock and key-packaging sleeve is folded or "setup";

FIG. 2 is a front view of the bicycle padlock and key sleeve in its assembled or "setup" condition, prior to being slipped onto the shackle of a bicycle padlock and receiving the key "-bubble";

FIG. 3 is a rear view of the "setup" sleeve of FIG. 2;

FIG. 4 is a top view thereof;

FIG. 5 is a transverse sectional view taken approximately along the line 5-5 in FIG. 7;

DESCRIPTION OF THE PREFERRED EMBODIMENT

Figure 7:
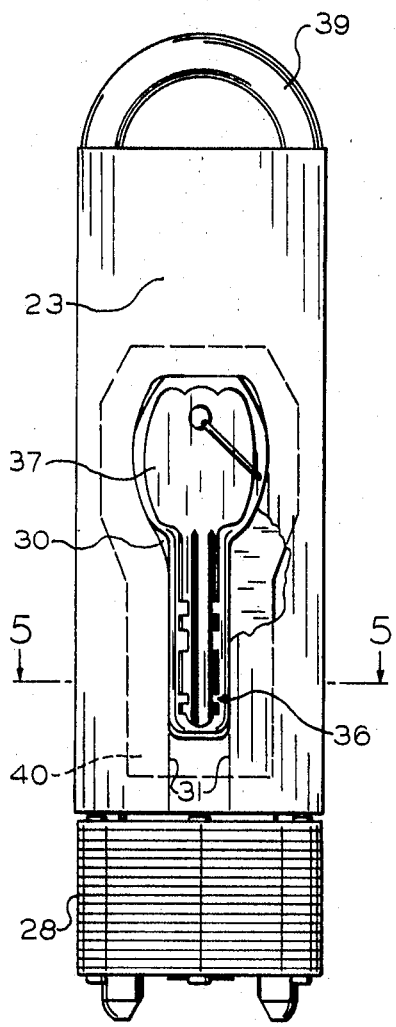
FIG. 7 is a front view of the sleeve engaged with the shackle of a bicycle padlock and having engaged thereon the key "-bubble", a portion of the front wall of the sleeve being broken away to show the overlapped "bubble" flange.

Referring first to FIG. 1 of the drawings, it will appear that the improved bicycle padlock and key sleeve blank from which the packaging sleeve is folded is of one piece, and it may be formed of paperboard, cardboard, or any other suitable similar material. That portion of the blank which ultimately forms the major portion of the rear face of the sleeve is of generally rectangular shape and is indicated by the numeral 15. At the top of the rectangular portion 15 are horizontal lines of slit 16 which leave between their inner ends a rear wall top extension 17, to the side margins of which there are foldably attached by scored lines 18 oblique shoulder-forming walls 19 whose outer margins are foldably connected to angularly related walls 20 by vertical fold lines 21. The numeral 22 designates a narrow side or edge wall for the sleeve which is foldably associated with the rectangular rear wall 15 and a generally rectangular front face wall 23 by scored lines 24 and 25 respectively, the top edge of said sidewall 22 being separated from the angularly related shoulder-forming walls 19 and 20 by the adjacent slit 16. It should be observed that the height of the front wall 23 is equal to that of the rear wall 15 plus its top extension 17. The left margin of the rear face 15 of the sleeve (relative to FIG. 1) also has foldably connected thereto by a scored line 26 another side or edge wall 27 separated at its top from the adjacent angularly related walls 19 and 20 by the slit 16. Coextensive with said edge wall 27 and the angular wall 20 thereabove is a securing flap 28 foldably associated with walls 27 and 20 by a scored line 29.

The front face wall 23 of the sleeve, from an intermediate area therein downwardly, is formed with a spoon-shaped opening 30 below which there are spaced-apart lightly scored lines 31 which will permit slight deflection or bending of the wall portion there adjacent when the "setup" sleeve is in its shackle and key "bubble" engaging condition. The right margin of the face wall 23 (relative to FIG. 1) has foldably associated therewith, by means of a scored line 32, an inner front face 33 of rectangular contour whose major portion is separated from an integral securing strip 34 by a lightly scored line 35. As will hereinafter appear, in the "setup" condition of the blank the securing flap 28 is overlapped by the securing strip 34 and the two areas are joined by a suitable adhesive. The scored line 35 permits the free major portion of the inner front face 33 to flex or deflect slightly, without affecting the securement between the flap 28 and strip 34, when a loaded key "bubble" 36 is inserted into the sleeve, as will hereinafter appear.

Figure 9:
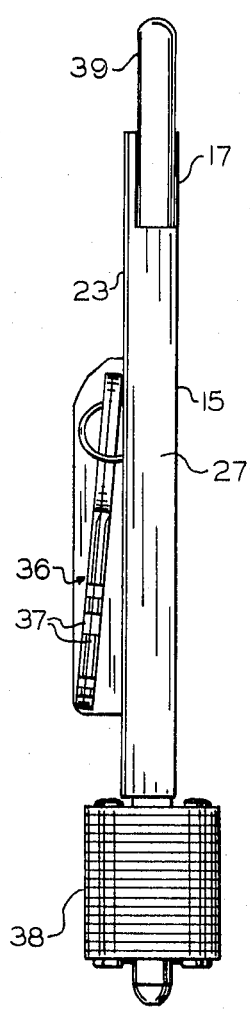
FIG. 9 is a side view thereof.
Figure 6:
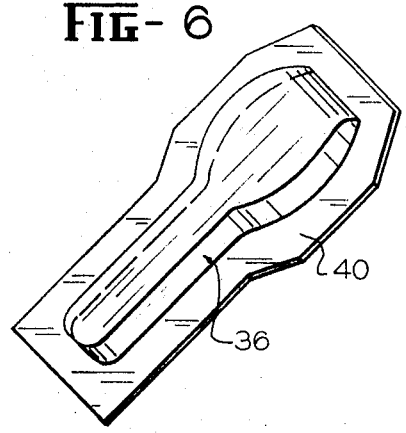
FIG. 6 is a front and side perspective view of the transparent "bubble" or key enclosure adapted for mounting in the sleeve.

The key "bubble" or "blister" 36 previously mentioned is shown in detail in FIG. 6, and in its sleeve-mounted environment in FIGS. 5, 7, and 9. Said key "bubble" has its major portion shaped to conform to the opening 30 in the front face wall 23 of the sleeve and is, in fact, in the form of a spoon or ladle open on its inner side in order to have introduced thereinto a pair of keys 37 for the particular padlock body 38 associated with the sleeve-encased padlock shackle 39. The dished out portion of the "bubble" 36 is of such size and proportion as to snugly accommodate the keys 37. Furthermore the "bubble" 36 is formed of a transparent material, such as plastic or the like, in order that the accommodated keys may be externally visible. The spoonlike body portion of the "bubble" is surrounded by an outwardly directed flange 40 which is of importance in effecting the nonremovable mounting of the "bubble" 36 within the sleeve face opening 30, as will hereinafter appear.

Figure 8:
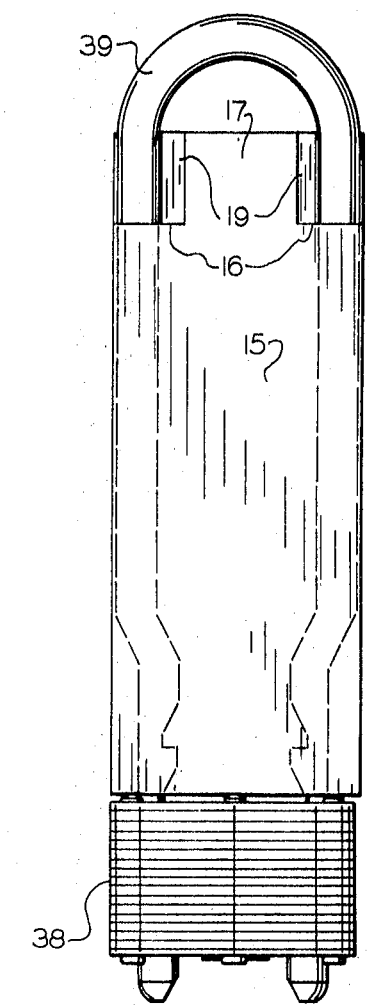
FIG. 8 is a rear view of the assemblage shown in FIG. 7.

When the sleeve is to be "setup" or formed from the flat blank of FIG. 1, it is merely necessary to fold the various walls on the lines of fold 25, 24, 26, 29, and 32 with the inner front face 33 and its integral securing strip 34 underlying the front face wall 23. The securing flap 28 flatly underlies the strip 34 and is held thereto by a suitable adhesive. Then the pairs of shoulder forming walls 19 and 20 at the top of the rear wall 15 and its marginal sidewalls 22 and 27 are folded angularly on the scored lines 18 and 21 and the lines of cut 16 permit them to separate from the top margins of the walls 15 and 27, whereby the walls 20 assume positions against the inner surface of the inner front face 33, and the walls 19 extend diagonally between the margins of wall portions 17 and 20, as is best shown in FIGS. 3 and 4, providing vertical entrance pockets 41 (see FIG. 4) at the top of the "setup" sleeve for the entrance of the legs of the padlock shackle 39. The sleeve as thus "setup" takes the form of the hollow four-sided sleeve shown in FIGS. 2, 3, and 4 although for purposes of storage and shipment the assembled sleeve can be flattened so that the end wall 22 is parallel with the back wall 15, and the end wall 27 is parallel with the front wall 23. When arranged in the condition of FIGS. 2, 3, and 4, however, the sleeve is elongated and of generally rectangular shape, open at both ends and hollow to adapt the sleeve to be slid over the major portion of the elongated shackle 39 of a bicycle padlock. Before that step is taken, however, the "bubble" or key enclosure 36 is loaded with the proper keys 37 for the padlock to be encased and the key enclosure is then slid into the bottom end of the sleeve between the front face wall 23 and the inner front face 33. The latter, being unsecured at its left edge, can flex or deflect inwardly slightly on the lightly scored line 35 enough to accommodate the "bubble" which is then brought into registration with the front face opening 30 with the major portion of the "bubble" projecting through said opening 30. Because of the transparency of the "bubble" the keys will be clearly visible from externally of the sleeve. The "bubble" flange 40 is frictionally confined between the front face wall 23 and the inner flexible front wall 33. The latter closes the open side of the "bubble" and retains the keys therein. Next, the elongated shackle 39, completely detached from its padlock body 38, has the free extremities of its legs entered into the top of the sleeve with said legs entering the pockets 41 and being guided by the walls 19. The insertion of the shackle is continued until the position of FIGS. 7, 8, and 9 is attained with the free ends of the shackle legs extending substantially beyond the bottom of the sleeve. The encased portion of the shackle lies inwardly of the inner front face 33 and is separated from the key "bubble". The lower extended portions of the shackle legs next receive the padlock body 38 which is pushed thereonto until the top of the body 38 abuts and closes the lower end of the sleeve and the locking mechanism (not shown) within the padlock body 38 snaps into registering notches in the shackle legs, as is common in long shackle padlocks of the type under consideration.

With the shackle encased in the manner described, longitudinal movement of the shackle and padlock body assemblage relative to the sleeve is precluded. The abutment of the padlock body with the lower end of the sleeve prevents longitudinal movement of the shackle relative to the sleeve in one direction, and if the assemblage were to be pulled in the other direction, the closed end of the shackle would bridge and contact the angular top walls 19 to prevent movement in that direction. Also, with the ends of the sleeve being closed it is not possible to gain entry to the interior of the sleeve for the purpose of unauthorizedly dislodging the key "bubble" 36. Nor, can the key "bubble" be completely removed outwardly through its sleeve opening 30, as this is prevented by the "bubble" flange 40 lodged internally of the front face 23. Accordingly, a tamperer cannot dislodge the keys from the complete package without tearing and completely mutilating the sleeve. Therefore, during shipment and while on display at a dealer's, the fitting keys for the package padlock will be retained therewith against loss or displacement.

The complete bicycle lock and key package, wherein the sleeve maintains the constituent parts in assembled relation, leaves visible the main elements of the padlock. The sleeve with its means for carrying and preventing unauthorized removal of a set of keys for the particular lock is of unique appearance and eliminates the need for confining the padlock and its companion keys in a box or carton or other packaging device, rendering the assemblage readily visible for inspection. Obviously outer face portions of the sleeve can carry the manufacturer's identifying indicia and other material.

The sleeve component is inexpensive to manufacture, is easy to "setup", is compact and convenient to apply to a bicycle padlock shackle, and is well adapted for the purposes described.

We claim:

1. A display package comprising: an elongated sleeve of rectangular section having a front face wall with an opening therein; a flanged key container mounted within the sleeve and having a protruding portion extending through said front face wall opening with the key container flange underlying the stock of said front face wall on opposite margins of the opening in the latter; a deflectable inner front face underlying said front face wall and its opening and the key container flanges throughout the breadth of said front face wall; a shackle equipped padlock having the major portion of the shackle encased by the sleeve with the closed end of the shackle extending exteriorly of one end of the sleeve and with outer end portions of the shackle legs extending exteriorly of the other end of the sleeve, intermediate portions of the shackle legs within the sleeve-contacting side extents of said deflectable inner front face to clamp the interposed flanged portions of the key container against said inner front face wall; and a padlock body applied to the outer end portions of the shackle legs and closing the adjacent end of the sleeve.

2. The display package recited in claim 1 wherein there are pocket and shoulder forming walls within upper side portions of the sleeve to accommodate encased leg portions of the padlock shackle with the shoulder forming walls being bridged by the exterior closed end portion of the shackle to prevent relative movement of the sleeve and shackle in one direction.

3. The display package recited in claim 2 wherein the upper end of the sleeve is of stepped formation and said pocket and shoulder forming walls extend obliquely between front and rear face portions of the sleeve.

4. The display package recited in claim 2 wherein the padlock body is locked onto the exteriorly extended outer end portions of the shackle legs in abutment with the adjacent end of the sleeve to prevent relative longitudinal movement between the sleeve and shackle in the opposite direction.

5. The display package recited in claim 1 wherein the key container is a spoon-shaped bubble completely filling and closing the opening in said front face wall.

6. The display package recited in claim 1 wherein the key container is a transparent "bubble" conforming to the shape of the opening in said front face wall and having an open inner side which is normally closed and covered by said deflectable inner front face.